(12) United States Patent
Kuroda et al.

(10) Patent No.: US 6,857,691 B2
(45) Date of Patent: Feb. 22, 2005

(54) FRONT STRUCTURE FOR VEHICLE

(75) Inventors: Hirokazu Kuroda, Tokyo (JP); Masanori Igarashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/757,412

(22) Filed: Jan. 15, 2004

(65) Prior Publication Data

US 2004/0145216 A1 Jul. 29, 2004

(30) Foreign Application Priority Data

Jan. 16, 2003 (JP) .................................. 2003-008069

(51) Int. Cl.⁷ .................................................. B60J 7/00
(52) U.S. Cl. ...................... 296/203.02; 296/203.01; 296/187.09; 296/204; 280/124.112; 280/124.155
(58) Field of Search ................ 296/203.02, 203.01, 296/203.04, 187.09, 204, 187.12, 187.11, 193.09; 280/124.128, 124.144, 124.15, 86.75, 124.143, 124.112

(56) References Cited

U.S. PATENT DOCUMENTS

| | | | | |
|---|---|---|---|---|
| 4,669,776 A | * | 6/1987 | Harasaki ................. | 296/203.02 |
| 4,673,205 A | * | 6/1987 | Drewek .................. | 296/187.11 |
| 4,789,199 A | * | 12/1988 | Komatsu ................. | 296/204 |
| 4,892,350 A | * | 1/1990 | Kijima .................. | 296/187.12 |
| 4,909,565 A | * | 3/1990 | Harasaki et al. ........ | 296/187.09 |
| 4,955,663 A | * | 9/1990 | Imura ................... | 296/203.02 |
| 5,024,482 A | * | 6/1991 | Isukimi et al. ......... | 296/203.02 |
| 5,160,206 A | * | 11/1992 | Haftmann et al. ........ | 400/250 |
| 5,433,479 A | * | 7/1995 | Shida et al. .......... | 280/124.112 |
| 5,660,415 A | * | 8/1997 | Redman et al. ......... | 296/204 |
| 5,884,963 A | * | 3/1999 | Esposito et al. ........ | 296/187.09 |
| 5,992,921 A | * | 11/1999 | Seki .................... | 296/203.01 |
| 6,109,631 A | * | 8/2000 | Jones et al. ........... | 280/124.143 |
| 6,113,180 A | * | 9/2000 | Corporon et al. ....... | 296/203.04 |
| 6,273,486 B1 | * | 8/2001 | Ezzat et al. ........... | 296/203.02 |
| 6,293,572 B1 | * | 9/2001 | Robbins et al. ........ | 280/124.155 |
| 6,299,240 B1 | * | 10/2001 | Schroeder et al. ...... | 296/203.01 |
| 6,666,501 B1 | * | 12/2003 | Logan et al. .......... | 296/203.01 |
| 2002/0063445 A1 | | 5/2002 | Takeuchi | |
| 2003/0034673 A1 | * | 2/2003 | Sugihara et al. ........ | 296/204 |
| 2004/0056515 A1 | * | 3/2004 | Nomura ................. | 296/193.09 |
| 2004/0140694 A1 | * | 7/2004 | Miyabayashi .......... | 296/203.02 |
| 2004/0145216 A1 | * | 7/2004 | Kuroda et al. ......... | 296/203.02 |

FOREIGN PATENT DOCUMENTS

| | | | |
|---|---|---|---|
| EP | 1 209 068 | | 5/2002 |
| JP | 62216872 | * | 9/1987 |
| JP | 8-198140 | | 8/1996 |
| JP | 8-230716 | | 9/1996 |
| JP | 1045034 | * | 2/1998 |

OTHER PUBLICATIONS

Copy of U.S. Appl. No. 10/749,503, filed Jan. 2, 2004.

* cited by examiner

*Primary Examiner*—Kiran Patel
(74) *Attorney, Agent, or Firm*—Smith, Gambrell & Russell, LLP (57) ABSTRACT

A front structure of a vehicle includes torque box members connecting front side frames and side sills, and front suspension member supports integrally provided on the torque box members. According to the structure of the present invention, the number of members is decreased, and the supporting rigidity of the front suspension member supports is increased. Furthermore, the geometry of the front suspension members supports is maintained by being prevented from local deformation by load application from the suspension member to the front suspension member supports. Thus, the excellent driving stability and maneuverability of the vehicle are assured.

3 Claims, 8 Drawing Sheets

Prior Art

FIG.7B

Prior Art

FIG.8A

Prior Art

FIG.8B

Prior Art

FRONT STRUCTURE FOR VEHICLE

BACKGROUND OF THE INVENTION

1. Field of the Invention

The present invention relates to a front structure of a vehicle.

2. Discussion of the Related Art

Figure 7A:
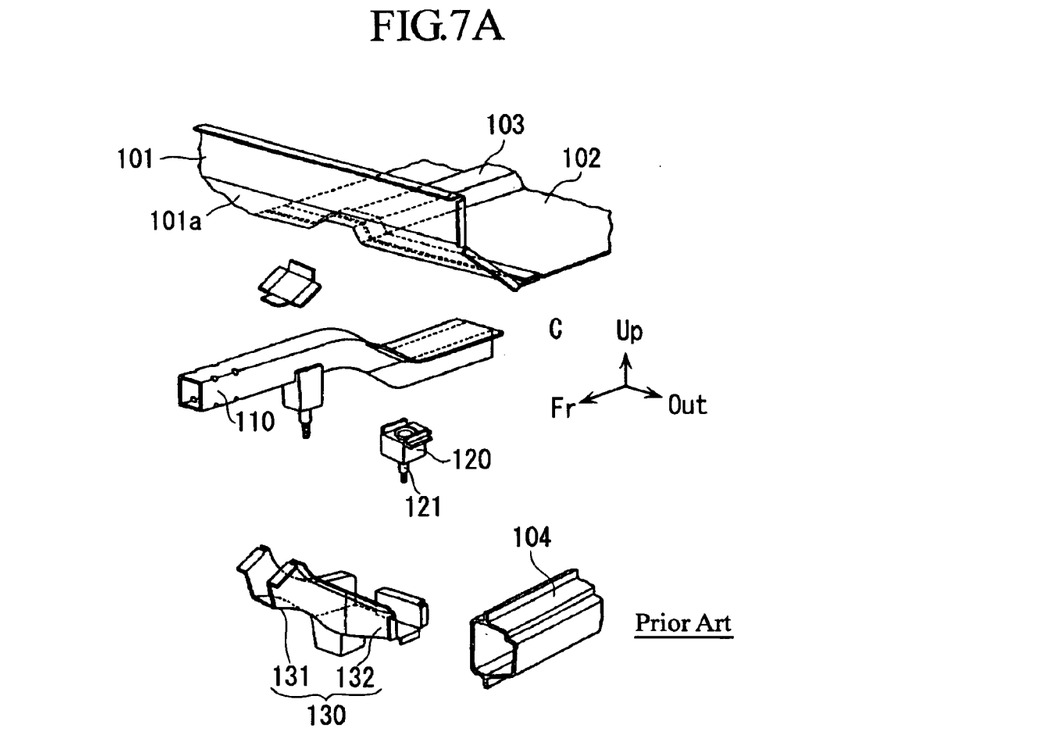
FIG. 7A is an exploded partial perspective view of a conventional front structure of a vehicle.
Figure 7B:
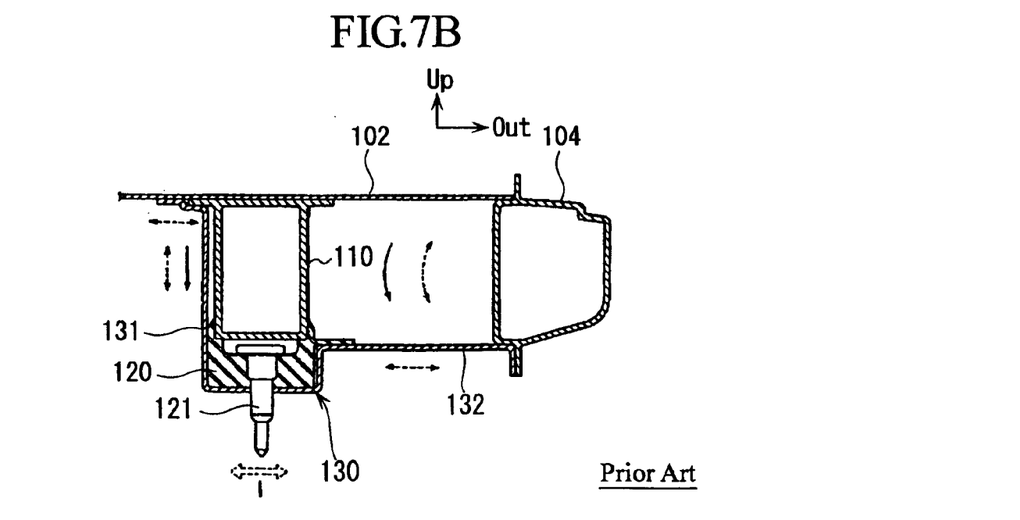
FIG. 7B is a vertical cross section of the front structure shown in FIG. 7A.

A front structure of a vehicle as shown in FIGS. 7A and 7B is known.

FIG. 7A is an exploded partial perspective view of a conventional front structure of the vehicle. FIG. 7B is a vertical cross section of the front structure of the vehicle. In the figures, arrows FR, OUT and UP respectively show a frontal direction, an outer direction, and an upper direction of the vehicle.

As shown in FIG. 7A, a toe board 101 in a plate form extends in a widthwise direction of the vehicle for partitioning an engine compartment and a passenger compartment. A lower part of the toe board 101 is formed as an inclining part 101a which downwardly inclines towards a rear part of the vehicle. A lower end of the inclining part 101a is connected to a front part of a floor panel 102. There is a tunnel part 103 extending in a lengthwise direction of the vehicle from a lower center part of the toe board 101 and a part on a centerline, with respect to the width, of the floor panel 102. A side sill 104 is provided on each end of the floor panel 102 with respect to the width of the vehicle. The side sill 104 extends in the lengthwise direction of the vehicle having a closed cross section.

FIGS. 7A and 7B show that a front side frame 110 extends in a lengthwise direction of the vehicle. The front side frame 110 is bent downwardly in contact with the toe board 101, and further extends on a lower surface of the floor panel 102. A rear part of the front side frame 110 has a cross section in the form of approximately a U shape. Lateral walls of the front side frames 110 have flanges. By bringing the flanges into contact with a lower part of the toe board 101 and the lower surface of the floor panel 102, the front side frame 110, the toe board 101, and the floor panel 102 define a closed cross section.

A rear bracket 120 is attached on each rear lower surface of the front side frame 110. The rear bracket 120 has a block shape with a predetermined thickness. At the center of the rear bracket 120, a supporting bolt 121 for supporting a rear part of a front suspension member (not shown) is provided so as to downwardly protrude.

A connecting member 130 covers the front side frame 110 from the bottom thereof over a predetermined length. The connecting member 130 has a main body 131 and an extension part 132 extending from the main body 131 to the side sill 104. An upper end of the main body 131 is connected to the inclining part 101a of the toe board 101. A free end of the extension part 132 is connected to the side sill 104, and an upper end thereof is connected a lower surface of the floor panel 102. The connecting member 130 supports the rear bracket 120. Furthermore, the connecting member 130 connects the front side frame 110 and the side sill 104. This structure is described, for instance, in Japanese Kokai Publication 8 (1996)-230716.

Figure 8A:
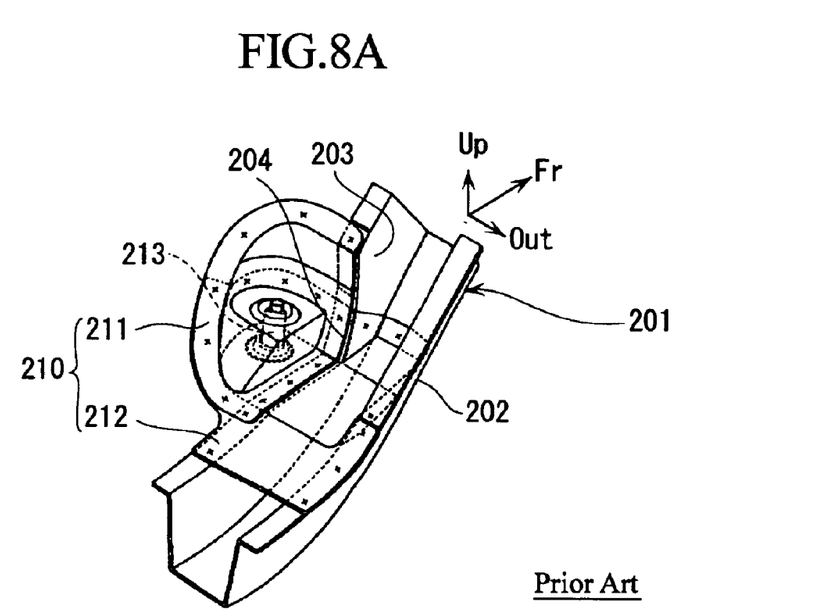
FIG. 8A is a perspective view of a conventional structure for a front suspension member support.
Figure 8B:
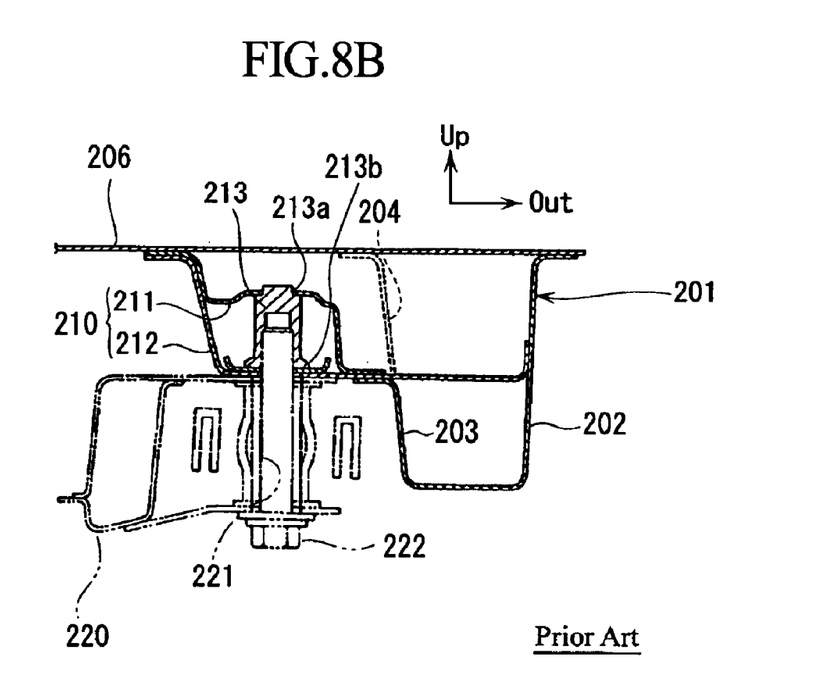
FIG. 8B is a vertical cross section of the structure shown in FIG. 8A.

Furthermore, there is a known front structure of a vehicle for supporting a front suspension member as described in FIGS. 8A to 8B. FIG. 8A is a perspective view of a conventional structure for a front suspension member support. FIG. 8B is a vertical cross section of the front structure in FIG. 8A.

As shown in FIG. 8A, a front side frame 201 has a curved part 202 extending in an approximately lengthwise direction of a vehicle with gently curving along a lower part of a toe board 206 (FIG. 8B). The curved part 202 has a notch 204 in the form of approximately a triangular shape in an inner wall 203 with respect to a widthwise direction of the vehicle.

A bracket 210 has an upper bracket 211 and a lower bracket 212, and a nut 213 is vertically provided therebetween. As shown in FIG. 8B, an upper part 213a of the nut 213 is fixed to the upper bracket 211, and a lower part 213b of the nut 213 is fixed to the lower bracket 212. The upper bracket 211 and the lower bracket 212 in a combined state are attached to the front side frame 201 so as to block the notch 204. Upper parts of the upper bracket 211 and lower bracket 212 are connected to the toe board 206.

A rear part of the front suspension member 220 is provided on a lower surface of the bracket 210. A supporting bolt 222 is upwardly inserted to a supporting hole 221, and an upper end is screwed into the nut 213 in the bracket 210. Thus, the rear part of the front suspension member 220 is supported on the vehicle body, as described in Japanese Kokai Publication 8 (1996)-198140.

In the above-mentioned front structure of the vehicle described in relation to FIGS. 7A and 7B, the rear bracket 120 and the connecting member 130 are independently formed. Therefore, the number of members to be used is increased and the mounting operation is complicated.

Similarly, in the front structure of a vehicle described in relation to FIGS. 8A and 8B, the upper bracket 211 and the lower bracket 212 are independently formed. Here, the number of the members is also increased and the mounting operation is complicated.

OBJECT AND SUMMARY OF THE INVENTION

It is therefore an object of the present invention to provide a front structure of a vehicle which can be structured from small number of members including torque box members assembled integrally with front suspension member supports by which the supporting rigidity of a suspension member with a suspension member support can be maintained. The object of the present invention is achieved by a front structure of a vehicle comprising a toe board extending in a widthwise direction of the vehicle for partitioning an engine compartment and a passenger compartment; a floor panel extending from a lower end of the toe board rearwardly; a pair of front side frames provided by being spaced apart from each other in a widthwise direction of the vehicle, the front side frames extending in a lengthwise direction of the vehicle from a part in front of the toe board to a lower part of the floor panel, the front side frames in front of the toe board being downwardly bent when in contact with the toe board; a pair of side sills extending in a lengthwise direction of the vehicle along lateral edges of the floor panel at outer positions with respect to the front side frames; torque box members extending from the front side frames in a widthwise direction of the vehicle and connecting the front side frames and the side sills; and front suspension member supports for supporting front suspension members, the front suspension member supports provided integrally with the torque box members.

Another object of the present invention is to provide a front structure of a vehicle wherein nuts for the front suspension member is rigidly supported without increasing the number of members. The object of the present invention is achieved by a front structure of a vehicle, wherein the front suspension member supports comprise nuts for supporting the front suspension members, and the torque box members including first members and second members, the nuts being fixed to the first members with first ends of the nuts being provided on the first members, the nuts being fixed to the second members with second ends of the nuts being provided on the second members.

A further object of the present invention is to provide a front structure of a vehicle wherein the nuts are firmly supported even when a load from the front suspension is applied to the nuts from any directions.

The further object of the present invention is achieved by a front structure of the vehicle, wherein the first members connects the front side frames and the side sills by extending from the front side frames in a rear outer direction of the vehicle, the second members connecting the front side frames and the side sills by extending in a widthwise direction therebetween.

BRIEF DESCRIPTION OF THE DRAWINGS

A more complete appreciation of the present invention and many of the attendant advantages thereof will be readily perceived as the same becomes better understood by reference to the following detailed description when considered in connection with the accompanying drawings, wherein.

DETAILED DESCRIPTION OF THE INVENTION

Other feature of the present invention will become understood in the course of the following description of exemplary embodiments, which are given for illustration of the present invention and are not intended to be limiting thereof. Arrows FR, OUT and UP in figures for explaining the present invention respectively show a frontal direction, an outer direction, and an upper direction of a vehicle. In the figures, the same reference numerals refer to identical members.

Figure 5:
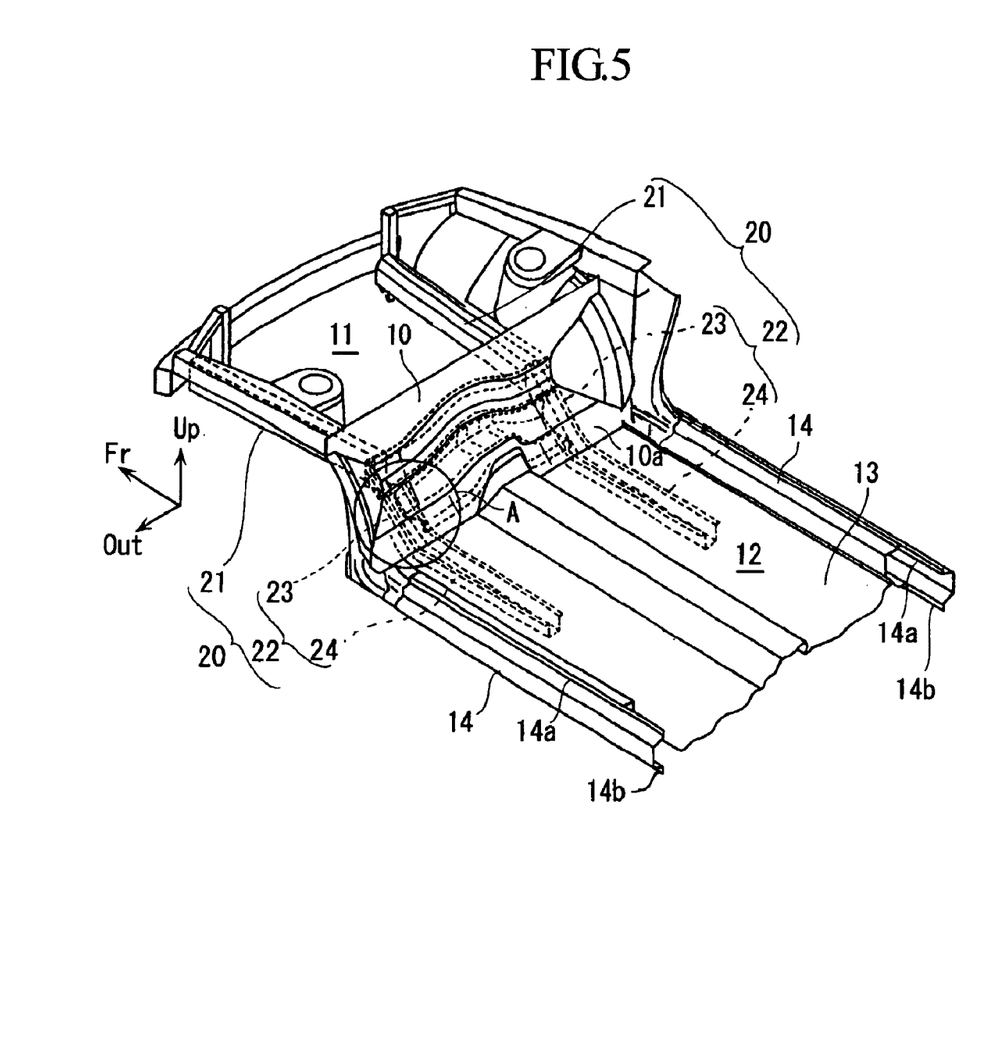
FIG. 5 is a perspective view for showing a front part of a vehicle wherein a front structure of the present invention is applied.

FIG. 5 is a schematic perspective view of a front structure of a vehicle according to the present invention. In the figure, a toe board 10 extends in a widthwise direction of a vehicle for partitioning the vehicle body into an engine compartment 11 and a passenger compartment 12. A lower part of the toe board 10 is formed as an inclining part 10a which downwardly inclines towards a rear part of the vehicle. A lower end of the inclining part 10a is connected to a front part of a floor panel 13. Side sills 14 extend along both lateral sides of the floor panel 13. The side sills 14 having closed cross sections extend in a lengthwise direction of the vehicle as parts of a framework of the vehicle. Each of the side sills 14 has upper and lower flanges 14a and 14b extending in a lengthwise direction of the vehicle.

A pair of front side frames 20 extend approximately in parallel with the side sills 14 so as to be provided at inner lower parts with respect to the side sills 14. The front side frames 20 are spaced apart from each other with extending in a lengthwise direction of the vehicle. The front side frames 20 has front frame parts 21, which are provided in a front part of the vehicle with respect to the toe board 10, and rear frame parts 22, which are provided in a rear part of the vehicle, extending from the front frame parts 21. The rear frame parts 22 include curved parts 23 which extend along the inclining part 10a of the toe board 10, and extension parts 24 extending from the curved parts 23 along a lower surface of the floor panel 13 so as to be approximately horizontally provided.

Figure 1:
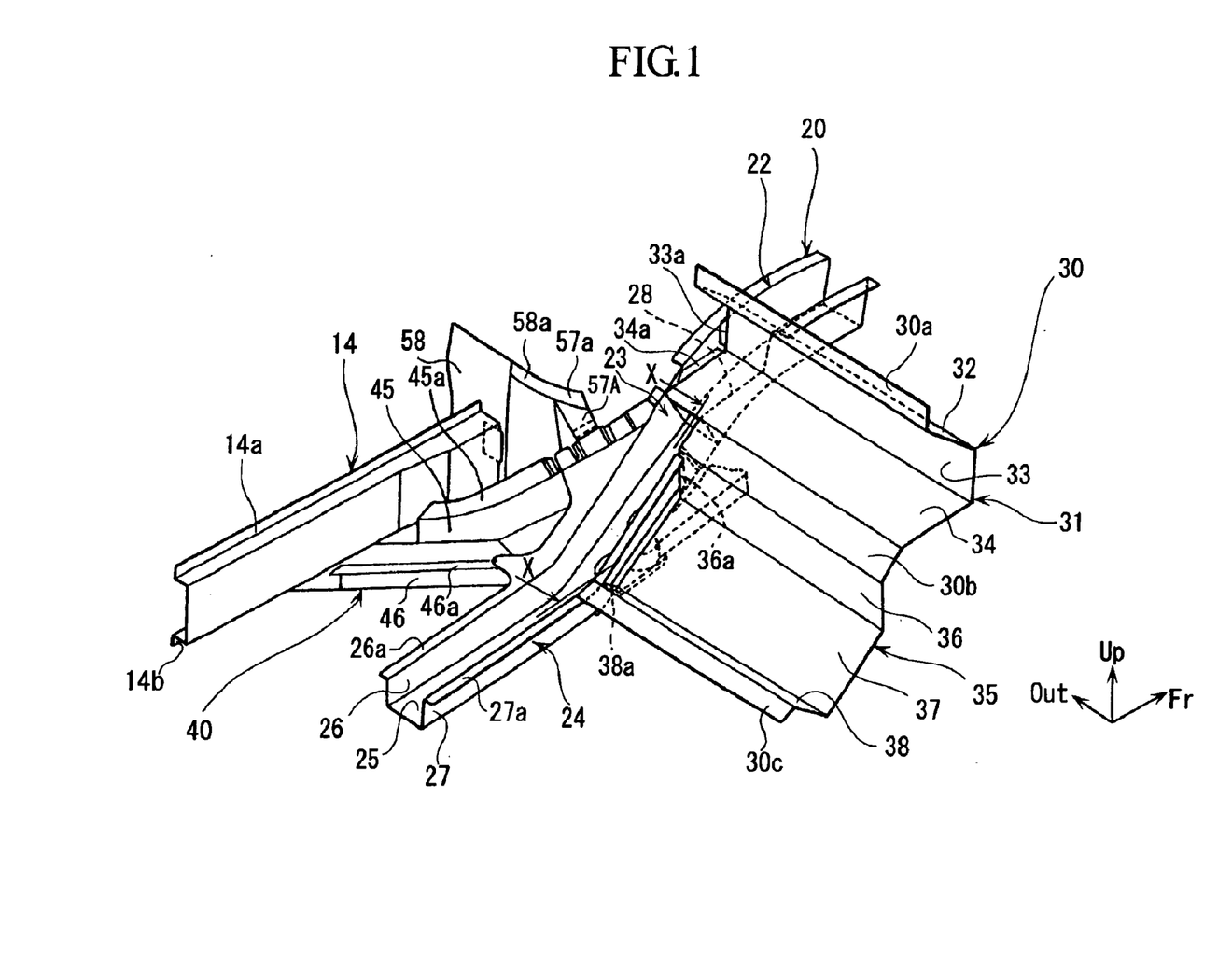
FIG. 1 is a perspective view of a front structure of a vehicle according to the present invention.
Figure 2:
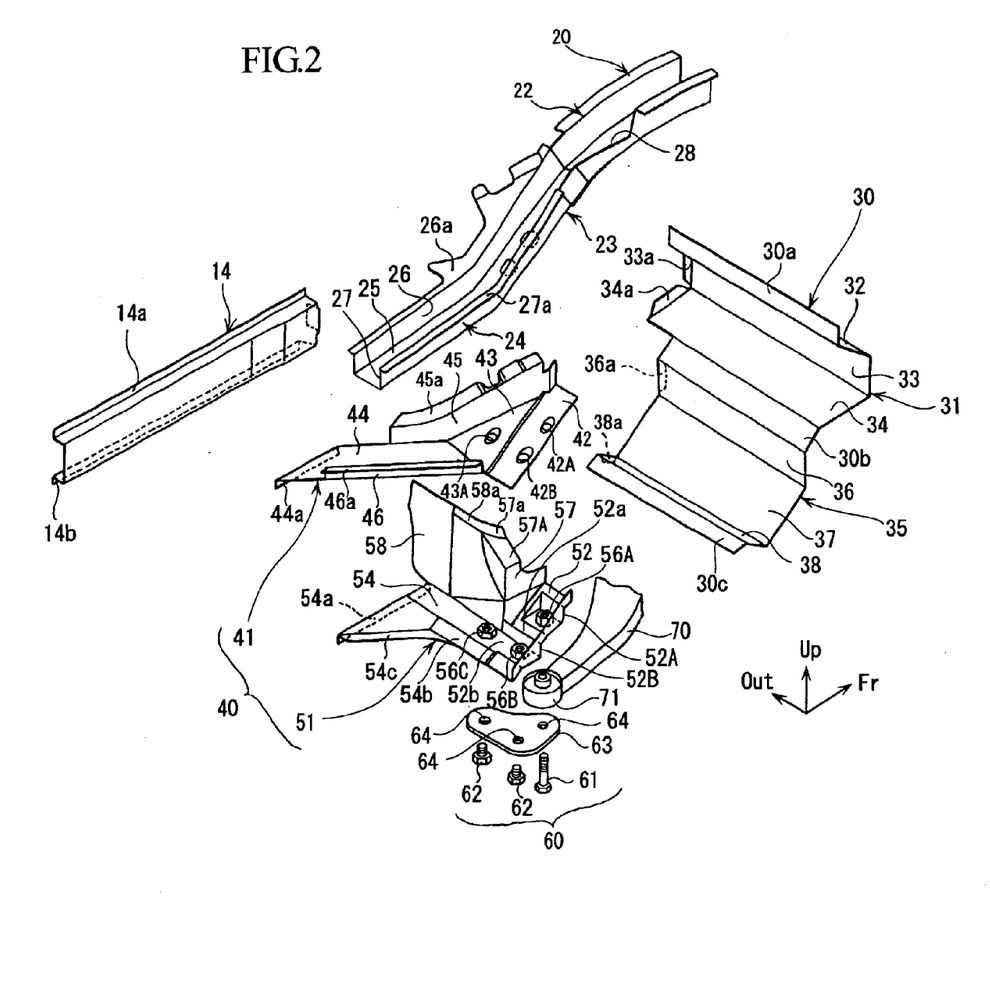
FIG. 2 is an exploded view of the front structure shown in FIG. 1.

FIG. 1 is an enlarged perspective view of part A of the front structure shown in FIG. 5. In FIG. 1, the A part is seen obliquely from a rear inner part of the vehicle. FIG. 2 is an exploded perspective view of the part shown in FIG. 1.

Figure 3:
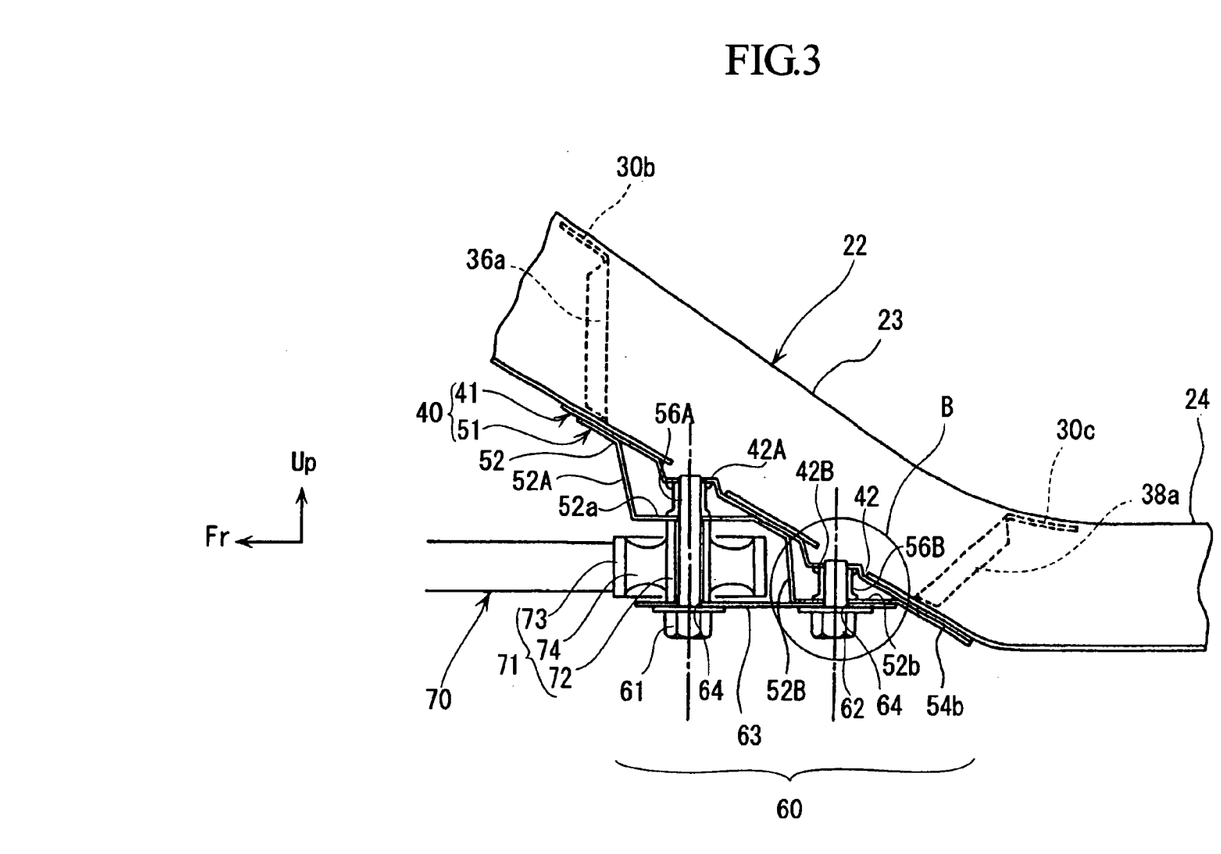
FIG. 3 is a cross section of the front structure shown in FIG. 1 seen in the direction of arrows X—X in FIG. 1.
Figure 4:
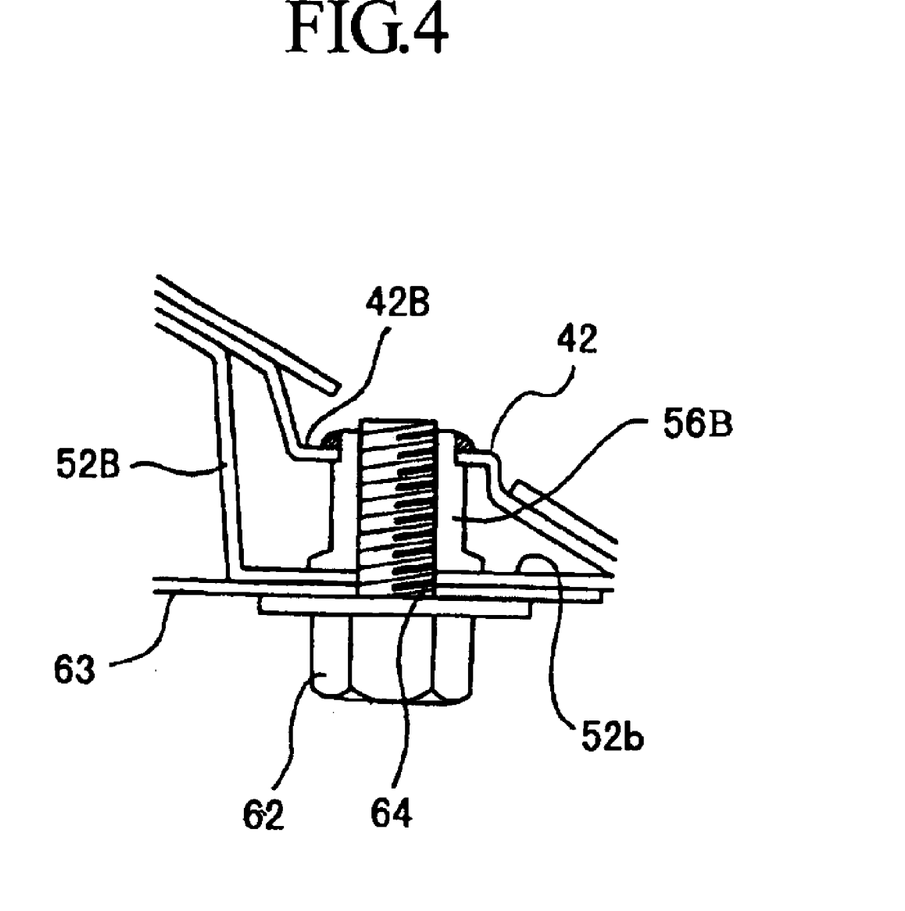
FIG. 4 is an enlarged view of B part shown in FIG. 3.

FIG. 3 is a cross section of a structure of a front suspension member support 60 cut along a line X—X and viewed in the direction of arrows. FIG. 4 is an enlarged view of B part shown in FIG. 3. In the following explanation, a front structure of a vehicle on a left side seen toward a front part of the vehicle is mainly explained. The explanation on the right side will be omitted since the front structure is symmetrically formed, substantially.

The rear frame part 22 of the front side frame 20 has a cross section in the form of an approximately U shape as shown in FIG. 1. The front side frame 20 has a bottom wall 25, and an outer lateral wall 26 and an inner lateral wall 27 which are provided at outer and inner positions with respect to the width of the vehicle. The outer and inner lateral walls 26 and 27 extend from the bottom wall 25 in an upper direction, and oppose to each other. The inner and outer lateral walls 26 and 27 have flanges 26a and 27a at upper ends thereof. The flanges 26a and 27a are connected to the inclining part 10a of the toe board 10 and a lower surface of the floor panel 13 (FIG. 5). Accordingly, structures with closed cross sections defined by 22, 10a and 13 extend in a lengthwise direction of the vehicle.

The inner lateral wall 27 has a notch 28 formed approximately in a triangular form by cutting out the inner lateral wall 27. The notch 28 has a shape downwardly extending from an upper part to a lower part of the lateral wall 27 at the curved part 23 and bending rearwardly at the lower part. The front side frames 20 are formed so as to fit a front surface 33 and a lower surface 34 of a cross member 30 which will be explained below.

As shown in FIGS. 1 and 2, the cross member 30 is provided to connect left and right front side frames 20. A torque box member 40 connects the front side frame 20 with the side sill 14.

When the cross member 30 is attached on a front surface of the toe board 10, an upper closed cross section and a lower cross section are defined, each extending in a widthwise direction of the vehicle. The cross member 30 has a three dimensional shape for connecting the left and right front side frames 20 to each other. The cross member 30 has an upper part 31 for forming a first closed cross section and a lower part 35 for forming a second closed cross section.

The upper part 31 has a cross section approximately in the form of a trapezoid. The upper part 31 is provided at a position where the front side frame 20 is in contact with the toe board 10, and protrudes from the toe board 10 toward a front part of the vehicle. The upper part 31 includes an upper surface 32, a front surface 33 and a lower surface 34. The upper surface 32 is formed as a gradually inclined surface which downwardly extends toward a front part of the vehicle. The front surface 33 extends from a front edge of the upper surface 32 by being downwardly bent. In other words, the front surface 33 opposes a front surface of the vehicle. The lower surface 34 extends from a lower edge of the front surface 33 by bending in a rearward direction with respect to the vehicle. A flange 30a is formed on the rear end of the upper surface 32. The flange 30a of the upper part 31 is connected to the toe board 10 (FIG. 5) at a position upper than the front side frame 20. Moreover, a flange 30b is formed on a rear edge of the lower surface 34 toward a downward direction. The flange 30b is connected to the toe board 10 (FIG. 5).

Both ends of the upper part 31, with respect to the width of the vehicle, passes through the notches 28 and inserted into the front side frames 20. The upper part 31 has flanges 33a and 34a on a lateral end, so that the upper part 31 is connected to an outer lateral wall 26 of the rear frame part 22. Therefore, the upper part 31 is provided so as to have both ends, with respect to a widthwise direction of the vehicle, between the front side frame 20 and the toe board 10.

On the other hand, the previously mentioned lower part 35 extending in a widthwise direction is provided at a position lower than the upper part 31 by extending from the flange 30b of the upper part 31. The lower part 35 has a cross section approximately in the form of a trapezoid by protruding from the toe board 10 downwardly. The lower part 35 includes a front surface 36, a lower surface 37 and a rear surface 38. Here, the front surface 36 extends obliquely from the toe board 10 toward a front lower part of the vehicle. The lower surface 37 extends from a lower edge of the front surface 36 along the bottom wall 25 of the rear frame part 22 by being bent at the lower edge of the front surface 36 toward a rear part of the vehicle. The rear surface 38 extends from a lower edge of the lower surface 37 by bending bent in a rearward direction of the vehicle. A flange 30c, which is bent rearwardly with respect to the vehicle, is provided at a rear edge of the rear surface 38. The lower part 35 is connected to the toe board 10 via the flange 30c. Both ends of the lower part 35, with respect to the width of the vehicle, are connected to the inner lateral walls 27 of the rear frame parts 20 via flanges 36a and 38a at positions in the vicinity of or close to the front suspension member support 60 of a torque box member 40, which will be explained below.

The torque box member 40 connects the front side frame 20 with the side sill 14 as shown in FIGS. 1 and 2. As can be seen from FIG. 2, the torque box member 40 is provided integrally with a front suspension member support 60 which supports a rear part of a front suspension member 70.

As shown in FIG. 2, the torque box member 40 includes a first member 41 and a second member 51. The first member 41 is provided between the front side frame 20 and the side sill 14. The first member 41 obliquely runs from the front side frame 20 to the side sill 14, with a front part of the first member 41 connected to the front side frame 20 and a rear part thereof connected to the side sill 14 which is provided in an outer position with respect to the side sill 14. The second member 51 is also provided between the front side frame 20 and the side sill 14 by extending in a widthwise direction of the vehicle. The torque box member 40 forms a triangular framework structure together with the side sill 14.

The structure of the torque box member 40 will be explained in detail as follows. FIG. 2 shows that the first member 41 of the torque box member 40 includes an upper connection plate 42 which is connected to the curved part 23 of the rear frame part 22 by superimposing on a lower surface of the curved part 23. The upper connection plate 42 in a rectangular form extends in a lengthwise direction of the vehicle. An upper extension plate 43 is formed integrally with an outer lateral end of the upper connection plate 42. The upper connection plate 42 and the upper extension plate 43 are provided in approximately the same plane, and extend in an outer direction of the vehicle.

The upper extension plate 43 has a triangular shape having a vertex of the triangle on a front part and a base thereof on a rear side of the vehicle. An upper horizontal plate 44 extends from a rear edge (base of the triangular shape) of the upper extension plate 43 along a lower surface of extension parts 24 of the rear frame part 22. A free end of the upper horizontal plate 44 extends to the side sill 14 by extending in a rear outer direction of the vehicle. A flange 44a is formed on the free end of the plate 44, and the flange 44a is connected to a flange 14b of the side sill 14.

An outer vertical wall 45 is formed on a lateral end of the upper extension plate 43 and upper horizontal plate 44. A height (vertical width) of the outer wall 45 is determined so as to have an upper edge of the upper wall 45 to be in approximately the same plane with an upper edge of the curved part 23. The outer wall 45 inclines in a rear lower direction, and extends obliquely between the curved part 23 of the rear frame part 22 and the side sill 14 so as to partition a space between the curved part 23 and the side sill 14 into a front half and a rear half (FIG. 1). A flange 45a is formed on the upper edge of the outer wall 45. The flange 45a is bent in an outer direction with respect to the vehicle width. The flange 45a is connected to the toe board 10 by interposing a flange 26a of the outer lateral wall 26 between the toe board 10 and the flange 45a.

As shown in FIG. 2, an inner vertical wall 46 extends from an inner edge of the upper horizontal plate 44 with respect to the width of the vehicle by bending in an upper direction. A height (vertical width) of the inner vertical wall 46 is determined so as to have an upper edge of the inner vertical wall 46 to be in approximately the same plane with an upper edge of the extension part 24. The inner vertical wall 46 inclines in a rear lower direction, and extends obliquely between the extension part 24 of the rear frame part 22 and the side sill 14 so as to partition a space between the extension part 24 and the side sill 14 into a front part and a rear part (FIG. 1). A flange 46a is formed on the upper edge of the inner vertical wall 46. The flange 46a is bent rearwardly and is connected to the lower surface of the floor panel 13.

The second member 51 includes a lower connection plate 52 which is connected to a lower surface of the upper connection part 42 of the first member 41. The lower connection plate 52 has an upper step 52A and a lower step 52B which are spaced apart from each other in a lengthwise direction of the vehicle. The upper step 52A and the lower step 52B are formed as concave parts (FIG. 2).

Figure 6A:
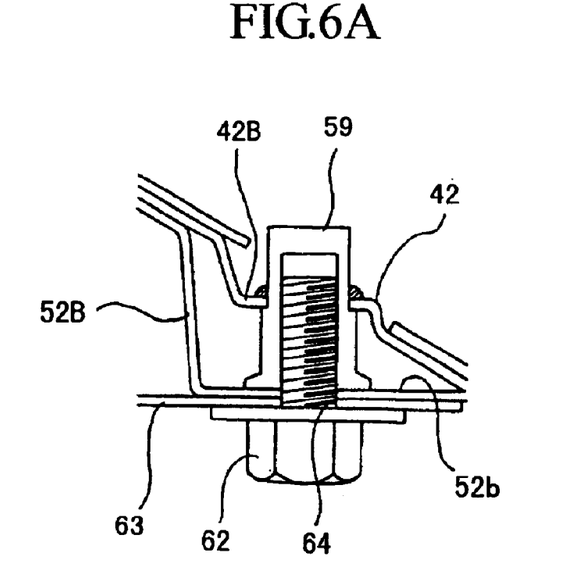
FIG. 6 is a diagram for explaining a front suspension member support as an embodiment of the present invention.
Figure 6B:
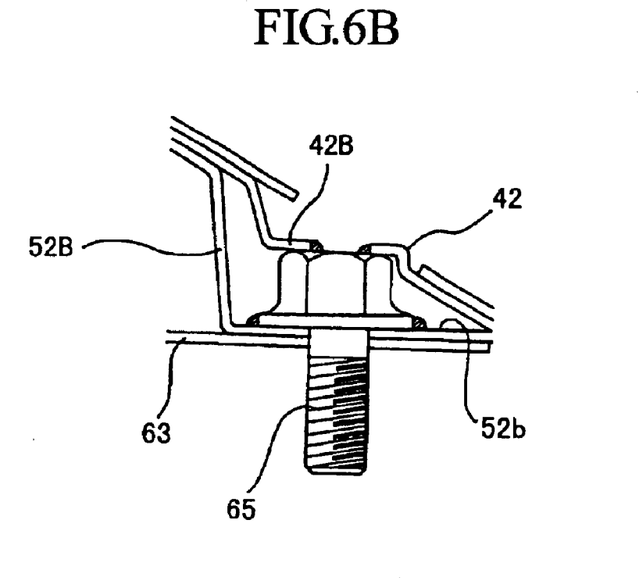

FIG. 3 shows that the upper step 52A and the lower step 52B have sizes for accommodating welded nuts 56A and 56B between the upper connection plate 42 and the lower connection plate 52. On the bottoms 52a and 52b of the upper and lower steps 52A and 52B, holes are provided for inserting a supporting bolt 61 and an installation bolt 62. The welded nuts 56A and 56B are provided above the holes. As shown in FIG. 4, the welded nut 56B has a shoulder at an upper part. The lower end of the nut 56B is fixed to the bottom 52b by welding. Likewise, the nut 56A has a structure corresponding to that of the nut 56B, and are fixed to the bottom 52a. The shapes of the nuts for this purpose is not limited to those in the figure. Alternatively, a cap nut 59 with a shoulder as shown in FIG. 6A, and a bolt 65 with a shoulder as shown in FIG. 6B can be used.

Referring back to FIG. 2, an outer wall 57 is provided at an outer front position of the lower connection plate 52, with respect to the vehicle. An upper part 57A of the outer wall 57 is bent toward an outer upper direction of the vehicle. The upper part 57A extends to a predetermined height having an angle for appropriately covering the flange 45a of the outer vertical wall 45. Namely, the outer wall 57 with the upper part 57A is covered with the outer vertical wall 45 with the flange 45a as can be seen from FIG. 1. A flange 57a is provided on an upper edge of the upper part 57A, and the flange 57a is connected to the toe board 10 (FIG. 5).

A front wall 58 is provided at an outer and rearward position with respect to the lower connection plate 52 and the outer wall 57. The front wall 58 extends from a rear end of the outer wall 57 and is connected to a front end of the side sill 14. The front wall 58 has a flange 58a on an upper edge. The flange 58a is connected to the toe board 10. The front wall 58 extends to an outer position with respect to the vehicle width beyond the side sill 14.

A lower horizontal plate 54 is provided at a rear outer position of the lower connection plate 52. The lower horizontal plate 54 is formed integrally with the bottom 52b of the lower step 52B in an outer direction of the vehicle. The bottom 52b and the lower horizontal plate 54 extend in approximately the same plane. In other words, the lower horizontal plate 54 extends from an outer part, with respect to the vehicle width, of the lower connection plate 52 to the side sill 14. There is a downwardly bent flange 54a on an outer lateral end of the lower horizontal plate 54. The flange 54a is connected to the flange 14b of the side sill 14. A rear outer part of the lower horizontal plate 54 is gradually narrowed in a rear outer direction.

The lower horizontal plate 54 has a hole for inserting installation bolts 62 at an outer position with respect to the lower step 52B. A welded nut 56C is provided on the hole, similar to the welded nuts 56A and 56B on the upper step 52A and the lower step 52B. As explained as to the welded nuts 56A and 56B in FIG. 3, the welded nut 56C is also fixed to the upper surface of the lower horizontal plate 54.

As shown in FIG. 2, a flange 54b is formed at a rear inner position of the lower horizontal plate 54. The flange 54b is connected to the upper extension plate 43 of the first member 41. Furthermore, a flange 54c is provided at a rear part outer position of the lower horizontal plate 54. The flange 54c is connected to the upper horizontal plate 44 of the first member 41.

The torque box member 40 is assembled by superimposing and connecting the first and second members 41 and 51. Therein, the upper connection plate 42 of the first member 41 is superimposed on the lower connection plate 52 of the second member 51, the flange 54b of the lower horizontal plate 54 with the rear edge of the upper extension plate 43, and the flange 54c of the lower horizontal plate 54 with a front end of the upper horizontal plate 44. In the course of assembling the torque box member 40, the upper edges of the welded nuts 56A, 56B and 56C are fixed to ceiling parts 42A, 42B and 43A by welding. The ceiling parts 42A and 42B are formed on the upper connection plate 42 at positions corresponding to the positions of nuts 56A, 56B, and the ceiling part 43A is formed on the upper extension plate 43 at a position corresponding to the position of the nut 56C.

Thereafter, the torque box member 40 is installed between the front side frame 20 and the side sill 14. Here, the upper connection plate 42 of the first member 41 is superimposed on the lower surface of the curved part 23 of the rear frame part 22, and connected therewith. The flange 44a of the upper horizontal plate 44 and the flange 54a of the lower horizontal plate 54 are connected to the lower flange 14b of the side sill 14. Moreover, the flange 45a of the outer lateral wall 45 and the flange 46a of the inner lateral wall 46 in the first member 41, and the flange 57a of the outer wall 57 and the flange 58a of the front wall 58 in the second member 51 are connected to the toe board 10 (refer to FIG. 1). Thus, the torque box member 40 is provided between the front side frame 20 and the side sill 14.

Accordingly, a structure with a closed cross section extending in a lengthwise direction of the vehicle is formed between the front side frame 20 and the side sill 14. The structure with a closed cross section is formed between the side sill 14 and the front side frame 20. The structure is defined by the outer and inner vertical walls 45 and 46 as front and rear walls, the toe board 10 and the floor panel 13 as an upper wall, and the upper extension plate 43 and the upper horizontal plate 44 as a lower wall. Namely, the torque box member 40 connects the front side frame 20 with the side sill 14, and a triangular framework structure is formed by cooperation with the side sill 14.

A front suspension member 70 supported by the front suspension support 60 is, for example, a transverse link, a suspension lower arm or a suspension sub-frame. An elastic bushing 71 is provided at a rear part of the front suspension member 70. The elastic bushing 71 is supported by the front suspension member support 60. FIG. 3 shows that the elastic bushing 71 includes an inner cylinder 72 in the form of a ring, an outer cylinder 73 provided so as to coaxially surround the inner cylinder 72, and an elastic member 74 interposed between the inner cylinder 72 and the outer cylinder 73. The supporting bolt 61 penetrates a center of the inner cylinder 72 for fixing the inner cylinder 72 so as to have the centerline extending in a vertical direction. The inner cylinder 72 is fixed to the upper step 52A with the upper end being in contact with the lower surface of the upper step 52A. The outer cylinder 73 is fixed to the rear part of the front suspension member 70. The elastic member 74 has a vibration proof effect, that is, to prevent the transmission of sound or vibration between the inner and outer cylinders 72 and 73. The inner cylinder 72 is longer than the outer cylinder 73 in the axial direction. Both ends of the inner cylinder 72 protrudes from ends of the outer cylinder 73 in the axial direction. The elastic member 74 has ends which are approximately in same planes with ends of the outer cylinder 73.

FIGS. 2 and 3 show a plate 63 for supporting the supporting bolt 61 on the bolt head side. The plate 63 is in the shape of approximately a plane with bolt holes 64 for accepting the supporting bolt 61 and the installation bolts 62. The bolt holes 64 are provided in the plate 63 at positions corresponding to the positions of the welded nuts 56A, 56B and 56C.

The installation of the front suspension member 70 to the front suspension member support 60 will now be explained.

First, the elastic bushing 71 is provided at a lower part of the upper step 52A. The supporting bolt 61 is inserted to the inner cylinder 72 through corresponding bolt hole 64 in the plate 63. The supporting bolt 61 is screwed into the welded nut 65A fixed between the upper step 52A and the upper connection plate 42. On the other hand, the installation bolts 62 is inserted into the bolt holes 64 in the plate 63. The installation bolts 62 are screwed into the welded nuts 65B and 65C. The nut 65B is fixed between the lower step 52B and the upper connection wall 42, and the nut 65C is fixed between the lower horizontal plate 54 and the upper connection wall 42. In this way, the elastic bushing 71 is supported on a lower part of the torque box with the upper end of the inner cylinder 72 being in contact with the lower surface of he upper step 52A, and the lower end of the inner cylinder 72 and the supporting bolt 61 having the plate 63 interposed therebetween.

The upper and lower edges of the welded nuts 56A, 56B and 56C are fixed to the first member 41 and the second member 51 by welding. As a result, the supporting rigidity is largely increased. Furthermore, it is possible to prevent supporting parts of the welded nuts 56A, 56B and 56C from locally deforming due to the application of a load.

Moreover, the first member 41 and the second member 51 of the torque box 40 form a triangular framework structure by cooperation with the side sill 14. The upper and lower edges of the welded nut 56A, 56B and 56C are supported in different directions, that is, in a widthwise direction and an outer and rear direction of the vehicle. When a load is applied from the front suspension member 70 in a lengthwise direction of the vehicle, the load is transmitted from the first member 41 to the side sill 14. Therefore, the applied load is transmitted to the entire vehicle body, and is effectively absorbed. When the above-mentioned load is applied in a widthwise direction, the applied load is transmitted from the second member 51 to the side sill 14. Also in this case, the applied load is transmitted (dispersed) to the entire vehicle body, and is effectively absorbed.

Accordingly, the welded nuts 56A, 56B and 56C are firmly supported when a load is applied from the front suspension member 70 in any direction. Consequently, it is possible to prevent the geometry of the front suspension from being changed. Thus, a vehicle with the front structure is driven with a good driving stability and maneuverability.

Moreover, the supporting bolt 61 is supported by the second member 51, with the bolt head side being supported on the second member 51 via the plate 63. Both the bolt head side and the other side of the bolt are supported, and hence the elastic bushing 71 is rigidly supported.

According to the above-mentioned front structure of the vehicle, the upper part for forming a closed cross section 31 of the cross member 30 is interposed between the front side frame 20 is in contact with the toe board 10. By the cross member 30, the left and right front side frames 20 are connected to each other. The above-mentioned structure with the closed cross section receives an impact load applied from a front part of the vehicle. Accordingly, it is possible to prevent the toe board 10 from directly receiving the impact load.

Moreover, the lower part for forming a closed cross section 35 connects the left and right fronts side frames 20 at parts in the vicinity of the front suspension member support 60. By this structure, the supporting rigidity of the front suspension supports 60 can be increased. It is possible to improve the rigidity against a load applied to the front suspension supports 60 from lateral sides of the vehicle via the front suspension members 70. Consequently, the front side frames 20 is protected from falling down (inclining) deformation in a widthwise direction the vehicle. Thus, the driving stability of the vehicle with the front structure of the present invention is improved.

The torque box member 40 provided between the front side frame 20 and the side sill 14, toe board 10 and floor panel 13 define a structure with a closed cross section. The structure extends in a widthwise direction of the vehicle. The torque box member 40 connects the front side frame 20 and the side sill 14, and is structured integrally with the front suspension support 60 for supporting the rear part of the front suspension member 70. Accordingly, it is not necessary to form an independent support for a front suspension member as in a conventional structure. This means that it is possible to decrease the number of members to be used, the weight of the vehicle, and manufacturing cost. Furthermore, it is possible to facilitate the assembly. In addition, it is possible to decrease the number of manufacturing steps, and hence the manufacturing cost.

By this structure, an impact load transmitted from the front suspension member 70 to the front suspension member support 60 is first distributed to the torque box 40 and then to the front side frame 20 and the side sill 14. Thereafter, the impact load is transmitted to the entire body of the vehicle, and the load is effectively absorbed by the entire body of the vehicle. Thus, local deformation is prevented, whereby the supporting rigidity of the front suspension member support 60 is maintained.

In particular, the first member 41 and the second member 51 of the torque box member 40, together with the side sill 14 form a triangular framework structure. The upper and lower edges of the welded nuts 56A, 56B and 56C are supported by the first member 41 and the second member 51 from different directions. By the firm support of the welded nuts 56A, 56B and 56C, the supporting rigidity of the front suspension member 60 is largely increased.

By the combination of the cross member 30 and the torque box members 40, a strong vehicle framework, which extends in a widthwise direction of the vehicle, is formed between the left and right side sills 14. The front suspension member support 60 is provided on the stably structured vehicle framework part.

Other structures and functions that may be disclosed in Japanese Patent Application 2003-008069, filed on Jan. 16, 2003 are hereby incorporated by reference into this application.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A front structure of a vehicle comprising:
   a toe board extending in a widthwise direction of the vehicle for partitioning an engine compartment and a passenger compartment;
   a floor panel extending rearwardly from a lower end of the toe board;
   a pair of front side frames provided by being spaced apart from each other in a widthwise direction of the vehicle, said front side frames extending in a lengthwise direction of the vehicle from a part in front of said toe board to a lower part of said floor panel, said front side frames in front of said toe board being downwardly bent when in contact with said toe board;

a pair of side sills extending in a lengthwise direction of the vehicle along lateral edges of said floor panel at outer positions with respect to said front side frames;

torque box members extending from said front side frames in a widthwise direction of the vehicle and connecting said front side frames and said side sills; and front suspension member supports provided integrally with said torque box members for supporting front suspension members.

2. The front structure of a vehicle as claimed in claim 1, wherein:

said front suspension member supports comprise nuts for supporting the front suspension members, and said torque box members including first members and second members, said nuts being fixed to said first members with first ends of said nuts being provided on said first members, said nuts being fixed to said second members with second ends of said nuts being provided on said second members.

3. The front structure of the vehicle as claimed in claim 2, wherein:

said first members connects said front side frames and said side sills by extending from said front side frames in a rear outer direction of the vehicle, said second members connecting said front side frames and said side sills by extending in a widthwise direction therebetween.

* * * * *